(12) United States Patent
Shin et al.

(10) Patent No.: US 7,514,679 B2
(45) Date of Patent: Apr. 7, 2009

(54) SCANNING PROBE MICROSCOPE FOR MEASURING ANGLE AND METHOD OF MEASURING A SAMPLE USING THE SAME

(75) Inventors: Hyun Seung Shin, Incheon (KR); Young Doo Kim, Seoul (KR); Yong Seok Kim, Seoul (KR); Sang-il Park, Seongnam (KR)

(73) Assignee: Park Systems Corp., Suwon (KR)

( * ) Notice: Subject to any disclaimer, the term of this patent is extended or adjusted under 35 U.S.C. 154(b) by 211 days.

(21) Appl. No.: 11/591,794

(22) Filed: Nov. 1, 2006

(65) Prior Publication Data

US 2008/0073519 A1 Mar. 27, 2008

(30) Foreign Application Priority Data

Jun. 2, 2006 (KR) .................... 10-2006-0050028

(51) Int. Cl.
*G01N 23/00* (2006.01)
*G02B 27/64* (2006.01)
*H01J 3/14* (2006.01)

(52) U.S. Cl. ................. 250/306; 250/307; 250/442.11; 73/105

(58) Field of Classification Search ................. 250/306, 250/307, 440.11, 442.11; 73/104, 105
See application file for complete search history.

(56) References Cited

U.S. PATENT DOCUMENTS

| | | | | |
|---|---|---|---|---|
| 5,440,920 A | * | 8/1995 | Jung et al. | 73/105 |
| 5,750,989 A | * | 5/1998 | Lindsay et al. | 250/306 |
| 5,773,824 A | | 6/1998 | Flecha et al. | |
| 6,000,281 A | * | 12/1999 | Burke | 73/105 |
| 6,169,281 B1 | * | 1/2001 | Chen et al. | 250/234 |
| 6,677,567 B2 | * | 1/2004 | Hong et al. | 250/201.3 |
| 2002/0048057 A1 | * | 4/2002 | Binnig et al. | 358/530 |
| 2003/0155481 A1 | * | 8/2003 | Hong et al. | 250/201.3 |
| 2004/0140424 A1 | * | 7/2004 | Kwon et al. | 250/234 |
| 2004/0140426 A1 | * | 7/2004 | Kwon et al. | 250/234 |
| 2008/0073519 A1 | * | 3/2008 | Shin et al. | 250/306 |
| 2008/0078932 A1 | * | 4/2008 | Park et al. | 250/306 |

* cited by examiner

*Primary Examiner*—Bernard E Souw
(74) *Attorney, Agent, or Firm*—Patterson & Sheridan, LLP

(57) ABSTRACT

Provided are a scanning probe microscope (SPM) that prevents a distortion of an image caused by alignment errors of scanners and a method of measuring a sample using the same. The scanning probe microscope comprises a probe; a first scanner changing a position of the probe along a straight line; a second scanner changing a position of a sample in a plane; and an adjusting device adjusting a position of the second scanner or the first scanner so that the straight line where the position of the probe is changed using the first scanner is perpendicular to the plane in which the position of the sample is changed using the second scanner.

11 Claims, 5 Drawing Sheets

SCANNING PROBE MICROSCOPE FOR MEASURING ANGLE AND METHOD OF MEASURING A SAMPLE USING THE SAME

CROSS-REFERENCE TO RELATED PATENT APPLICATIONS

This application claims the benefit of Korean Patent Application No. 10-2006-0050028, filed on Jun. 2, 2006, in the Korean Intellectual Property Office, the disclosure of which is incorporated herein in its entirety by reference.

BACKGROUND OF THE INVENTION

1. Field of the Invention

The present invention relates to a scanning probe microscope (SPM) for measuring angle and a method of using the same, and more particularly, to an SPM which prevents a distortion of an image caused by alignment errors of scanners, and a method of measuring a sample using the same.

2. Description of the Related Art

Scanning probe microscopes (SPMs) have nano-scale resolution in order to show the shape of a surface of a sample or an electrical characteristic of the sample as an image. SPMs include atomic force microscopes (AFMs), magnetic force microscopes (MFMs), and scanning capacitance microscopes (SCMs). SPMs are used to analyze the shape of a surface of a sample or an electrical characteristic of the sample by moving a tip of a probe in contact with the surface of the sample or by moving the tip of the probe at a predetermined distance above the surface of the sample. However, in the case of a conventional scanning probe microscope, there is a problem in that a characteristic of data obtained by moving the tip of the probe may be different from that of an actual sample due to alignment errors of scanners.

FIG. 1 is a schematic perspective view of a conventional scanning probe microscope. Referring to FIG. 1, a first scanner 31 and a second scanner 32 are placed on a frame 50. A probe 10 is attached to an end of the first scanner 31 and the first scanner 31 moves the probe 10 in a ±z-direction. A stage 20 is provided on the second scanner 32 and the second scanner 32 moves the stage 20 on an xy-plane. When a sample is disposed on the stage 20, the first scanner 31 moves the probe 10 in the ±z-direction and the second scanner 32 moves the stage 20, that is, the sample, on the xy-plane so that data related to the shape of a surface of the sample or an electrical characteristic of the sample can be obtained.

FIG. 2 is a schematic conceptual view for the case of measuring the shape of a surface of a sample by scanning the sample using an ideal SPM. The ideal SPM means a microscope in which a straight line where the position of a probe 10 is changed using a first scanner 31 is perpendicular to a plane in which the position of the sample is changed using a second scanner (not shown). In FIG. 2, the probe 10 appears as if it moves in an x-direction or a y-direction. However, this is just for the convenience of explanation. Actuality, the probe 10 moves only in the ±z-direction, that is, only vertically, and the sample moves on the xy-plane.

As illustrated in FIG. 2, when the tip of the probe 10 contacts a surface 60 of the sample, the sample moves on the xy-plane using the second scanner. At this time, when a protuberance exists on the surface 60 of the sample, the length of the first scanner 31 is changed and the position of the probe 10 is changed in the ±z-direction. At this time, an image 70 corresponding to the shape of the surface 60 of the sample is realized using data related to a change of the length of the first scanner 31.

FIG. 3 is a schematic conceptual view for the case of measuring the shape of a surface of a sample by scanning the sample using a conventional scanning probe microscope.

As described above, a first scanner 31 changes the position of a probe 10 along a straight line and a second scanner (not shown) changes the position of the sample on a plane. Thus, the straight line where the position of the probe 10 is changed using the first scanner 31 may not be perpendicular to the plane in which the position of the sample is changed using the second scanner since errors exist in the alignment of the first scanner 31 and the second scanner. As illustrated in FIG. 3, the straight line where the position of the probe 10 is changed using the first scanner 31 is not perpendicular to the plane in which the position of the sample is changed using the second scanner and is inclined with respect to the plane by a predetermined angle θ. When the shape of a surface 60 of the sample is measured in this state, there is a problem in that an image 70 different from the shape of the surface 60 of the actual sample is realized, as illustrated in FIG. 3.

SUMMARY OF THE INVENTION

The present invention provides a scanning probe microscope which prevents a distortion of an image caused by alignment errors of scanners, and a method of measuring a sample using the same.

According to an aspect of the present invention, there is provided a scanning probe microscope comprising: a probe; a first scanner changing a position of the probe along a straight line; a second scanner changing a position of a sample in a plane; and an adjusting device adjusting a position of the second scanner or the first scanner so that the straight line where the position of the probe is changed using the first scanner is perpendicular to the plane in which the position of the sample is changed using the second scanner.

The scanning probe microscope may further comprise a stage for supporting the sample, and the second scanner may change a position of the stage on a plane.

The adjusting device may obtain a first shape of the sample along a straight line in a plane in which a position of the sample is changed using the second scanner, may rotate the sample by 180 degrees in the plane in which the position of the sample is changed using the second scanner, may obtain a second shape along the straight line in the plane in which the position of the sample is changed using the second scanner, may calculate an average shape of the first shape and the second shape, and may adjust the position of the second scanner or the first scanner according to a difference between any one of the first shape and the second shape and the average shape.

The adjusting device may measure three-dimensional coordinates on a surface of the sample at both ends of a straight line in a plane in which the position of the sample is changed using the second scanner, may obtain a first straight line for connecting the two three-dimensional coordinates, may rotate the sample by 180 degrees in the plane in which the position of the sample is changed using the second scanner, may measure three-dimensional coordinates on the surface of the sample at both ends of the straight line in the plane in which the position of the sample is changed using the second scanner, may obtain a second straight line for connecting the two three-dimensional coordinates, may calculate an average straight line of the first straight line and the second straight line, and may adjust the position of the second scanner or the first scanner according to a difference between any one of the first straight line and the second straight line and the average straight line.

The adjusting device may measure three-dimensional coordinates on a surface of the sample at both ends of a straight line in a plane in which the position of the sample is changed using the second scanner, may obtain a first straight line for connecting the two three-dimensional coordinates, may calculate a length $l_1$ of an orthogonal projection of the first straight line onto a plane in which the position of the sample is changed using the second scanner, may rotate the sample by 180 degrees in the plane in which the position of the sample is changed using the second scanner, may measure three-dimensional coordinates on the surface of the sample at both ends of the straight line in the plane in which the position of the sample is changed using the second scanner, may obtain a second straight line for connecting the two three-dimensional coordinates, may calculate a length $l_2$ of an orthogonal projection of the second straight line onto a plane in which the position of the sample is changed using the second scanner, and may adjust the position of the second scanner or the first scanner by an angle of $\arctan((l_1-l_2)/2z)$ when a height difference on the surface of the sample at both ends of the straight line in the plane in which the position of the sample is changed using the second scanner is z.

According to another aspect of the present invention, there is provided a method of measuring a sample using a scanning probe microscope comprising a probe, a first scanner changing a position of the probe along a straight line, and a second scanner changing a position of a sample in a plane, the method comprising: obtaining a first shape of the sample along a straight line in a plane in which the position of the sample is changed using the second scanner; rotating the sample by 180 degrees in the plane in which the position of the sample is changed using the second scanner and obtaining a second shape of the sample along the straight line in which the plane in which the position of the sample is changed using the second scanner; and calculating an average shape of the first shape and the second shape.

According to another aspect of the present invention, there is provided a method of measuring a sample using a scanning probe microscope comprising a probe, a first scanner changing a position of the probe along a straight line, and a second scanner changing a position of a sample in a plane, the method comprising: obtaining a first shape of the sample along a straight line in a plane in which the position of the sample is changed using the second scanner; rotating the sample by 180 degrees in the plane in which the position of the sample is changed using the second scanner, obtaining a second shape of the sample along the straight line in which the plane in which the position of the sample is changed using the second scanner, and obtaining an average shape of the first shape and the second shape; and adjusting the position of the second scanner or the first scanner according to a difference between any one of the first shape and the second shape and the average shape so that the straight line where the position of the probe is changed using the first scanner is perpendicular to the plane in which the position of the sample is changed using the second scanner.

According to another aspect of the present invention, there is provided a method of measuring a sample using a scanning probe microscope comprising a probe, a first scanner changing a position of the probe along a straight line, and a second scanner changing a position of a sample in a plane, the method comprising: measuring three-dimensional coordinates on a surface of a sample at both ends of a straight line in a plane in which the position of the sample is changed using the second scanner, and obtaining a first straight line for connecting the two three-dimensional coordinates; rotating the sample by 180 degrees in the plane in which the position of the sample is changed using the second scanner, measuring three-dimensional coordinates on the surface of the sample at both ends of the straight line in the plane in which the position of the sample is changed using the second scanner, and obtaining a second straight line for connecting the two three-dimensional coordinates; and calculating an average straight line of the first straight line and the second straight line, and adjusting the position of the second scanner or the first scanner according to a difference between any one of the first straight line and the second straight line and the average straight line.

According to another aspect of the present invention, there is provided a method of measuring a sample using a scanning probe microscope comprising a probe, a first scanner changing a position of the probe along a straight line, and a second scanner changing a position of a sample in a plane, the method comprising: measuring three-dimensional coordinates on a surface of a sample at both ends of a straight line in a plane in which the position of the sample is changed using the second scanner, obtaining a first straight line for connecting the two three-dimensional coordinates, and calculating a length $l_1$ of an orthogonal projection of the first straight line into a plane in which the position of the sample is changed using the second scanner; rotating the sample by 180 degrees in the plane in which the position of the sample is changed using the second scanner, measuring three-dimensional coordinates on the surface of the sample at both ends of the straight line in the plane in which the position of the sample is changed using the second scanner, obtaining a second straight line for connecting the two three-dimensional coordinates, and calculating a length $l_2$ of an orthogonal projection of the second straight line into a plane in which the position of the sample is changed using the second scanner; and adjusting the position of the second scanner or the first scanner by an angle of $\arctan((l_1-l_2)/2z)$ when a height difference on the surface of the sample at both ends of the straight line in the plane in which the position of the sample is changed using the second scanner is z so that the straight line where the position of the probe is changed using the first scanner is perpendicular to the plane in which the position of the sample is changed using the second scanner.

The method may further comprise calibrating the first scanner by inputting information to the scanning probe microscope, the information being that an electrical signal from the first scanner obtained when a step difference of a sample having a known step difference is measured corresponds to the known step difference.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
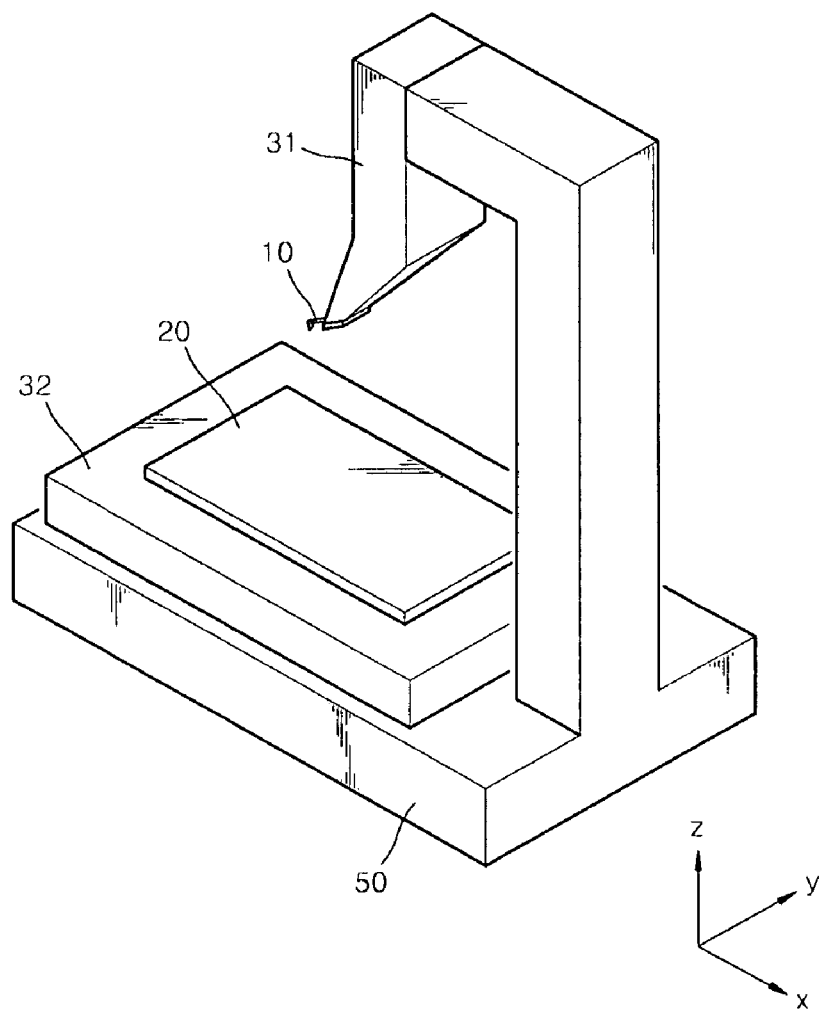
FIG. 1 is a schematic perspective view of a conventional scanning probe microscope.
Figure 2:
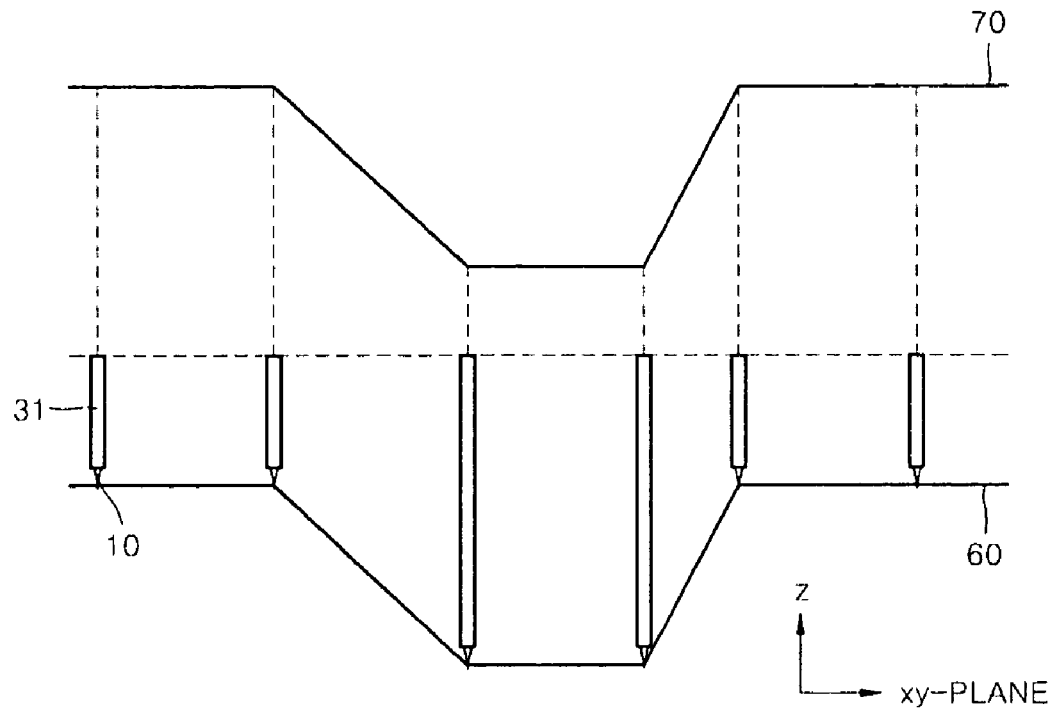
FIG. 2 is a schematic conceptual view for the case of measuring the shape of a surface of a sample by scanning the sample using an ideal scanning probe microscope.
Figure 3:
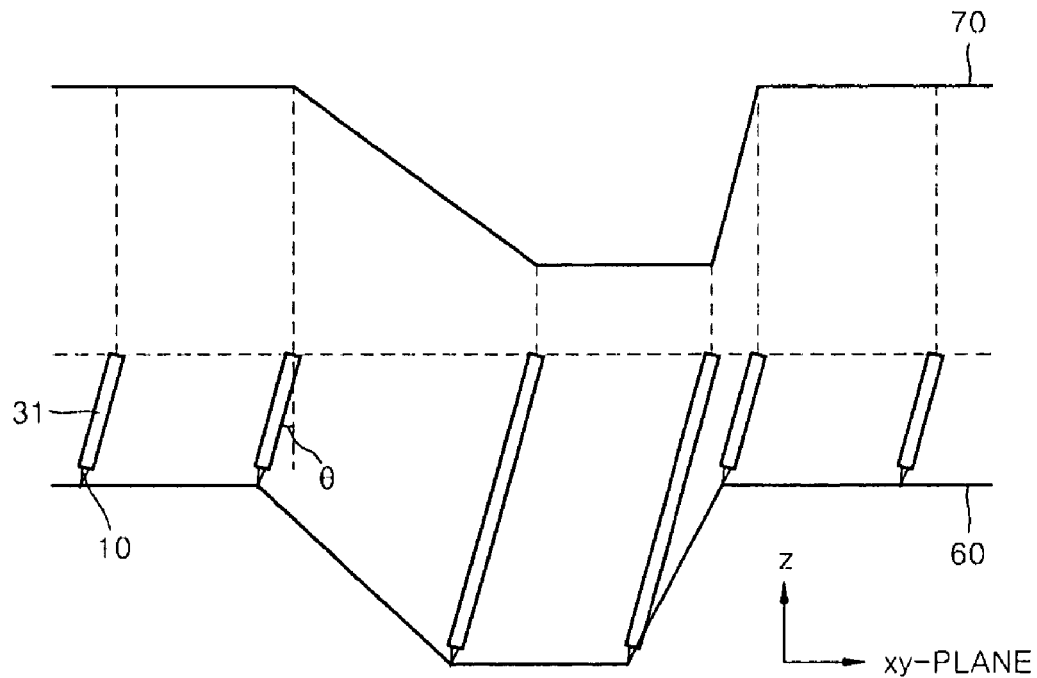
FIG. 3 is a schematic conceptual view for the case of measuring the shape of a surface of a sample by scanning the sample using a conventional scanning probe microscope.
Figure 4:
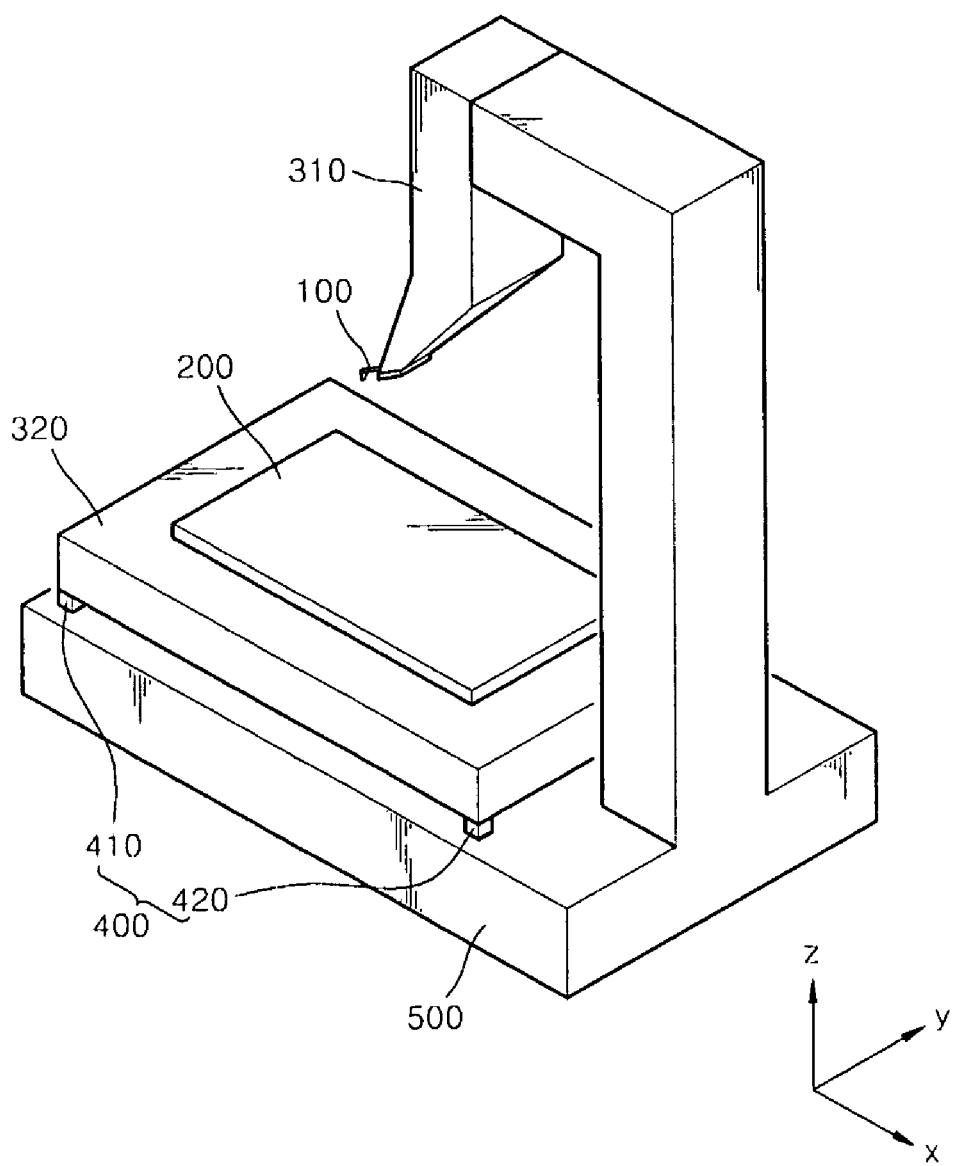
FIG. 4 is a schematic perspective view of a scanning probe microscope according to an embodiment of the present invention.

FIG. 4 is a schematic perspective view of a scanning probe microscope according to an embodiment of the present invention. Referring to FIG. 4, the scanning probe microscope includes a probe 100, a first scanner 310, a second scanner 320, and an adjusting device 400. The probe 100 may include a cantilever having attached to an end thereof a sharp tip.

The first scanner 310 changes the position of the probe 100 along a straight line. In FIG. 4, the probe 100 moves in a ±z-direction using the first scanner 310. The second scanner 320 changes the position of a sample 200. In FIG. 4, the sample 200 moves in an xy-plane using the second scanner 320. Hereinafter, for the convenience of explanation, the first scanner 310 moves the probe 100 in the ±z-direction and the second scanner 320 moves the position of the sample 200 in the xy-plane. However, the present invention is not limited to this. For example, although the sample 200 is disposed directly on the second scanner 320, as illustrated in FIG. 4, the sample 200 may be disposed on a stage for supporting the sample 200, if necessary, or the stage may move on the xy-plane using the second scanner 320.

As described previously for the case of the ideal scanning probe microscope, the straight line where the position of the probe 100 is changed using the first scanner 310 is perpendicular to the plane in which the position of the sample 200 is changed using the second scanner 320. However, in a conventional scanning probe microscope, errors exist in the alignment of the first scanner 310 and the second scanner 320. Thus, the straight line where the position of the probe 100 is changed using the first scanner 310 is not perpendicular to the plane in which the position of the sample 200 is changed using the second scanner 320 and is inclined with respect to the plane by a predetermined angle θ. Thus, when the shape of the surface of the sample is measured, there is a problem in that an image different from the shape of the surface of the actual sample is realized.

To address this problem, the scanning probe microscope of the present embodiment includes the adjusting device 400. The adjusting device 400 adjusts the position of the second scanner 320 so that the straight line where the position of the probe 100 is changed using the first scanner 310 is perpendicular to the plane in which the position of the sample is changed using the second scanner 320. In FIG. 4, the adjusting device 400 adjusts the position of the second scanner 320. However, unlike this, the adjusting device may adjust the position of the first scanner 310. In addition, in FIG. 4, the adjusting device 400 includes four sub-adjusting devices 410, 420 and are provided at each edge of the second scanner 320, and other two sub-adjusting devices are not shown. However, the present invention is not limited to this, and the adjusting device 400 may be provided as one element below a middle portion of the second scanner 320.

The scanning probe microscope illustrated in FIG. 4 includes the adjusting device 400 for adjusting the position of the second scanner 320 or the first scanner 310 as explained above. As such, an image distortion caused by alignment errors of the first scanner 310 and the second scanner 320 in the conventional scanning probe microscope can be effectively prevented. A method of determining an angle at which the position of the second scanner 320 or the first scanner 310 is adjusted so that the straight line where the position of the probe 100 is changed using the first scanner 310 is perpendicular to the plane in which the position of the sample is changed using the second scanner 320 will now be described with reference to FIGS. 5A through 5C.

Figure 5A:
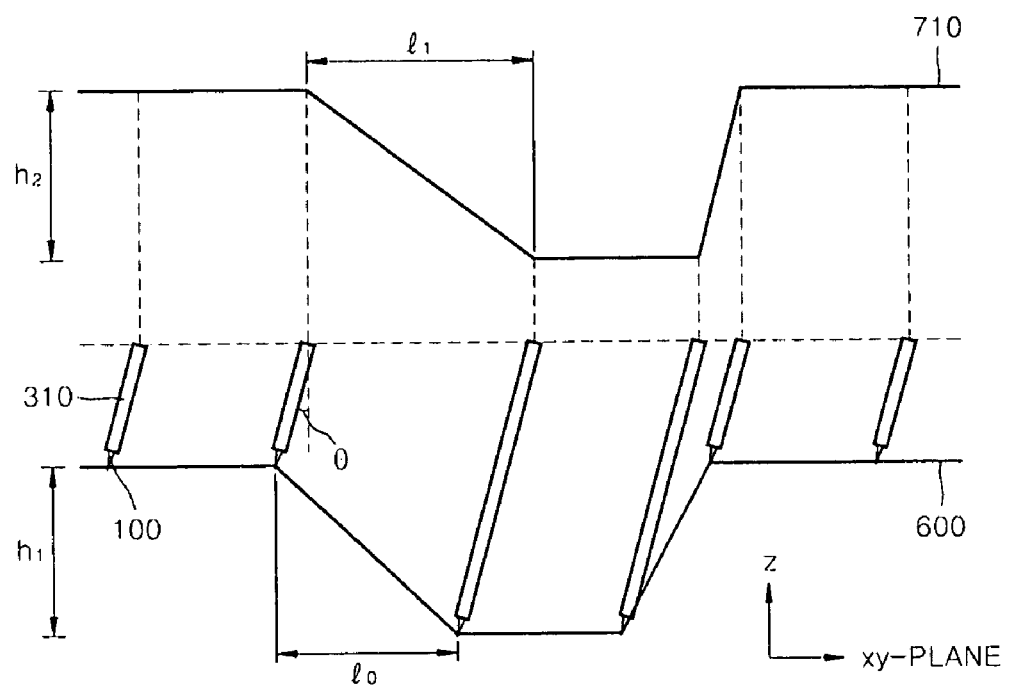
FIGS. 5A through 5C are schematic cross-sectional views for illustrating a method of correcting an angle or a method of obtaining the shape of a sample in the scanning probe microscope illustrated in FIG. 4.
Figure 5B:
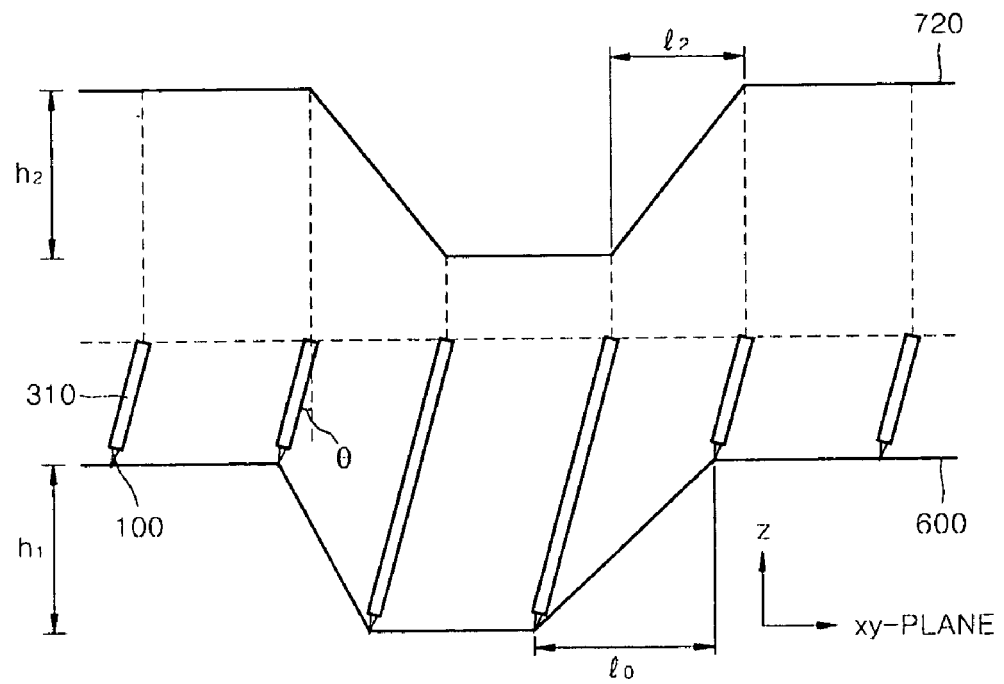
Figure 5C:
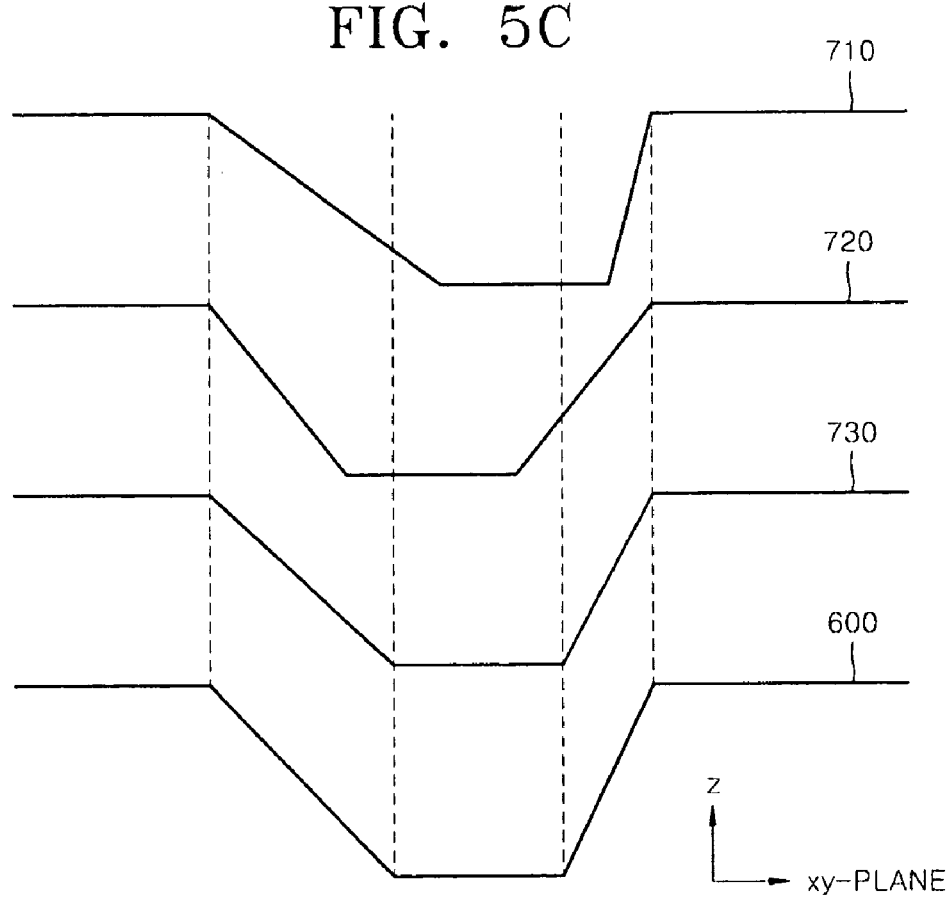

FIGS. 5A through 5C are schematic cross-sectional views for illustrating a method of correcting an angle or a method of obtaining the shape of a sample in the scanning probe microscope illustrated in FIG. 4.

Referring to FIG. 5A, a first shape 710 of a sample is obtained along a straight line in a plane (xy-plane) in which the position of the sample is changed using the second scanner 320. Of course, since a straight line where the position of the probe 100 is changed using the first scanner 310 is inclined by a predetermined angle θ with respect to a plane in which the position of the sample is changed using the second scanner 320, as illustrated in FIG. 5A, the first shape 710 does not accurately correspond to the surface 600 of the sample.

After that, the sample is rotated by 180 degrees in the plane (xy-plane) in which the position of the sample is changed using the second scanner 320, and a second shape 720 of the sample is obtained along a straight line in the plane (xy-plane) in which the position of the sample is changed using the second scanner 320, as illustrated in FIG. 5B. At this time, the straight line in the plane in which the position of the sample is changed using the second scanner 320 when the second shape 720 is obtained coincides with a straight line in the plane in which the position of the sample is changed using the second scanner 320 when the first shape 710 is obtained. Of course, since a straight line where the position of the probe 100 is changed using the first scanner 310 is inclined by a predetermined angle θ with respect to a plane in which the position of the sample is changed using the second scanner 320, as illustrated in FIG. 5B, the second shape 720 does not accurately correspond to the surface 600 of the sample.

After the first shape 710 and the second shape 720 are obtained, an average shape 730 of the first shape 710 and the second shape 720 is obtained, as illustrated in FIG. 5C. Here, the average shape is characterized by an average of coordinates in a horizontal direction in FIG. 5C. That is, an average of a horizontal coordinate in the first shape 710 and a horizontal coordinate in the second shape 720 is a horizontal coordinate in the third shape 730. This is applied to a method of obtaining an average shape in a subsequent embodiment or modified example of the present invention. The average shape 730 obtained in this manner accurately corresponds to the surface 600 of the actual sample, as illustrated in FIG. 5C. Thus, a difference between any one of the first shape 710 and the second shape 720 and the average shape 730 is calculated so that an angle at which the straight line in which the position of the probe 100 is changed using the first scanner 310 is inclined with respect to the plane in which the position of the sample is changed using the second scanner 320 can be calculated. After that, the position of the first scanner 310 or the second scanner 320 is adjusted using the adjusting device 400 by the angle θ so that the straight line where the position of the probe 100 is changed using the first scanner 310 is perpendicular to the plane in which the position of the sample is changed using the second scanner 320. After that, scanning is performed in all regions of the sample so that accurate data related to the shape of the surface of the sample or an electrical characteristic of the sample can be obtained.

Also, without obtaining the shape of the surface of the sample along the straight line in the plane (xy-plane) in which the position of the sample is changed using the second scanner 320, three-dimensional coordinates on the surface of the sample corresponding to both ends of a straight line in the plane (xy-plane) in which the position of the sample is changed using the second scanner 320 may be measured and a straight line for connecting the two three-dimensional coordinates may also be used.

Figure 5D:
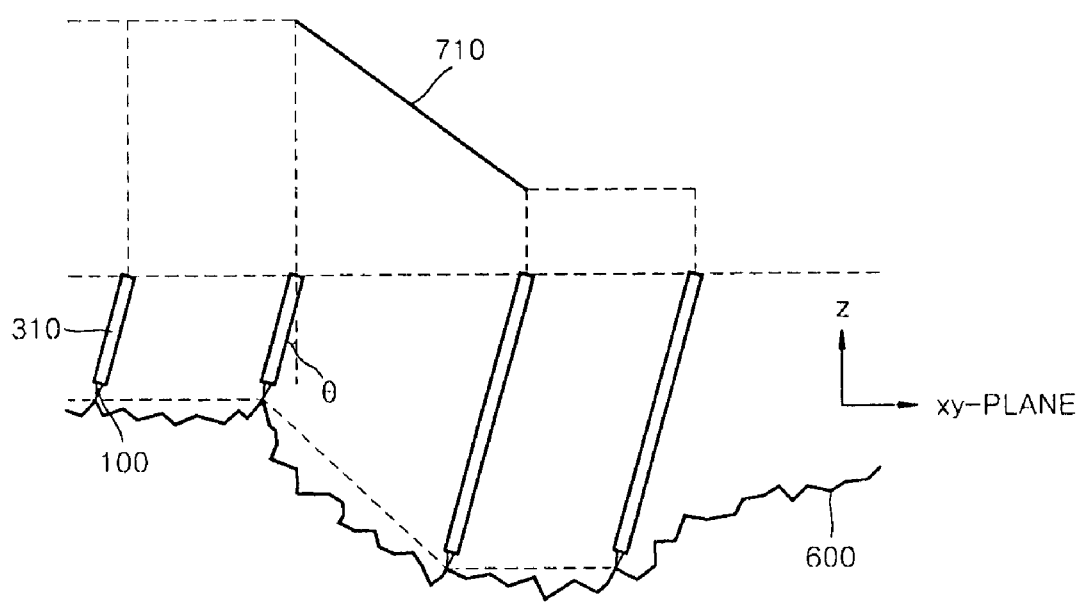
FIG. 5D is a schematic cross-sectional view illustrating another method of correcting an angle or another method of obtaining the shape of a sample in the scanning probe microscope illustrated in FIG. 4.

That is, three-dimensional coordinates on the surface of the sample at both ends of the straight line in the plane (xy-plane) in which the position of the sample is changed using the second scanner 320 are measured and a first straight line 710 for connecting the two three-dimensional coordinates is obtained, as illustrated in FIG. 5D. After that, the sample is rotated by 180 degrees in the plane (xy-plane) in which the position of the sample is changed using the second scanner 320. Then, three-dimensional coordinates on the surface of the sample at the same ends of the straight line in the plane (xy-plane) in which the position of the sample is changed using the second scanner 320 are measured and a second straight line (not shown) for connecting the two three-dimensional coordinates is obtained. Then, an average straight line of the first straight line 710 and the second straight line is obtained and the position of the second scanner 320 or the first scanner 310 may also be adjusted according to a difference between any one of the first straight line 710 and the second straight line and the average straight line.

In addition, the adjusting device 400 may also adjust the position of the second scanner 320 or the first scanner 310. That is, three-dimensional coordinates on the surface of the sample at both ends of the straight line in the plane (xy-plane) in which the position of the sample is changed using the second scanner 320 are measured and a first straight line for connecting the two three-dimensional coordinates is obtained, as illustrated in FIG. 5A. Then, a length $l_1$ of an orthogonal projection image of the first straight line onto the plane (xy-plane) in which the position of the sample is changed using the second scanner 320 is obtained. After that, the sample is rotated by 180 degrees in the plane (xy-plane) in which the position of the sample is changed using the second scanner 320. Then, three-dimensional coordinates on the surface of the sample at the same ends of the straight line in the plane (xy-plane) in which the position of the sample is changed using the second scanner 320 are measured and a second straight line for connecting the two three-dimensional coordinates is obtained. Then, a length $l_2$ of an orthogonal projection image of the second straight line into the plane (xy-plane) in which the position of the sample is changed using the second scanner 320 is obtained.

The lengths $l_1$ and $l_2$ can be obtained using equations 1 and 2 with respect to a length $l_0$ of the orthogonal projection onto the xy-plane of a straight line for connecting the surface of the sample at the same ends of the straight line in the plane (xy-plane) in which the position of the sample is changed using the second scanner 320.

$$l_1 = l_0 + h_2 \tan\theta \quad (1)$$

$$l_2 = l_0 - h_1 \tan\theta \quad (2)$$

Meanwhile, the method may further include an operation of calibrating the first scanner 310 using a sample having a known step difference. In this operation, an electrical signal, which is obtained from the first scanner 310 when the measured step difference of the sample corresponds to the known step difference, is input to the scanning probe microscope. When the operation is performed, step differences $h_1$ and $h_2$ before and after the sample is rotated by 180 degrees, respectively, have the same value, that is, a value corresponding to a step difference of the surface of the actual sample. Thus, when $l_0$ is eliminated from equations 1 and 2, and if z, which is a value corresponding to the step difference of the surface of the actual sample is used, instead of using $h_1$ and $h_2$, equation 3 is obtained.

$$\theta = \arctan((l_1 - l_2)/2z) \quad (3)$$

Accordingly, the position of the second scanner 320 or the first scanner 310 is adjusted by the obtained angle so that the straight line where the position of the probe 100 is changed using the first scanner 310 is perpendicular to the plane in which the position of the sample is changed using the second scanner 320. After that, scanning is performed in all regions of the sample so that accurate data related to the shape of the surface of the sample or the electrical characteristic of the sample can be obtained.

Meanwhile, the shape of the surface of the actual sample may also be accurately measured without making the straight line where the position of the probe 100 is changed using the first scanner 310 be perpendicular to the plane in which the position of the sample is changed using the second scanner 320.

That is, referring to FIG. 5A, the first shape 710 of the sample is obtained along a straight line in a plane (xy-plane) in which the position of the sample is changed using the second scanner 320. Of course, since a straight line where the position of the probe 100 is changed using the first scanner 310 is inclined by a predetermined angle θ with respect to a plane in which the position of the sample is changed using the second scanner 320, as illustrated in FIG. 5A, the first shape 710 does not accurately correspond to the surface 600 of the sample.

After that, the sample is rotated by 180 degrees in the plane (xy-plane) in which the position of the sample is changed using the second scanner 320, and a second shape 720 of the sample is obtained along a straight line in the plane (xy-plane) in which the position of the sample is changed using the second scanner 320, as illustrated in FIG. 5B. At this time, the straight line in the plane in which the position of the sample is changed using the second scanner 320 when the second shape 720 is obtained is the same as a straight line in the plane in which the position of the sample is changed using the second scanner 320 when the first shape 710 is obtained. Of course, since a straight line where the position of the probe 100 is changed using the first scanner 310 is inclined by a predetermined angle θ with respect to a plane in which the position of the sample is changed using the second scanner 320, as illustrated in FIG. 5B, the second shape 720 does not accurately correspond to the surface 600 of the sample.

After the first shape 710 and the second shape 720 are obtained, an average shape 730 of the first shape 710 and the second shape 720 is obtained, as illustrated in FIG. 5C. The average shape 730 accurately corresponds to the surface 600 of the actual sample, as illustrated in FIG. 5C. Thus, the shape of the surface of the sample is measured twice, that is, before and after the sample is rotated by 180 degrees and the average shape thereof are obtained so that accurate data related to the shape of the surface of the sample or an electrical characteristic of the sample can be obtained.

As described above, according to the scanning probe microscope and the method of using the same according to the present invention, a distortion of an image caused by alignment errors of scanners can be prevented.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A scanning probe microscope comprising:
a probe;
a first scanner for changing a position of the probe alone a straight line;
a second scanner for changing a position of a sample in a plane; and
an adjusting device for adjusting a position of the second scanner or the first scanner by an adjustment angle, so that the straight line along which the position of the probe is changed using the first scanner is perpendicular to the plane in which the position of the sample is changed using the second scanner,
wherein the adjustment angle is calculated based on a first shape of the sample that is obtained along a straight line in a plane in which a position of the sample is changed using the second scanner, and
a second shape that is obtained along the straight line in the plane in which the position of the sample is changed using the second scanner after the sample has been rotated by 180 degrees.

2. A scanning probe microscope comprising:
a probe;
a first scanner for changing a position of the probe along a straight line;
a second scanner for changing a position of a sample in a plane; and
an adjusting device for adjusting a position of the second scanner or the first scanner, so that the straight line along which the position of the probe is chanced using the first scanner is perpendicular to the plane in which the position of the sample is changed using the second scanner,
wherein the adjusting device measures three-dimensional coordinates on a surface of the sample at both ends of a straight line in a plane in which the position of the sample is changed using the second scanner, obtains a first straight line for connecting the two three-dimensional coordinates, rotates the sample by 180 degrees in the plane in which the position of the sample is changed using the second scanner, measures three-dimensional coordinates on the surface of the sample at both ends of the straight line in the plane in which the position of the sample is changed using the second scanner, obtains a second straight line for connecting the two three-dimensional coordinates, calculates an average straight line of the first straight line and the second straight line, and adjusts the position of the second scanner or the first scanner according to a difference between any one of the first straight line and the second straight line and the average straight line.

3. A scanning probe microscope comprising:
a probe;
a first scanner for changing a position of the probe along a straight line;
a second scanner for changing a position of a sample in a plane; and
an adjusting device for adjusting a position of the second scanner or the first scanner, so that the straight line along which the position of the probe is changed using the first scanner is perpendicular to the plane in which the position of the sample is changed using the second scanner,
wherein the adjusting device measures three-dimensional coordinates on a surface of the sample at both ends of a straight line in a plane in which the position of the sample is changed using the second scanner, obtains a first straight line for connecting the two three-dimensional coordinates, calculates a length $l_1$ of an orthogonal projection of the first straight line onto a plane in which the position of the sample is changed using the second scanner, rotates the sample by 180 degrees in the plane in which the position of the sample is changed using the second scanner, measures three-dimensional coordinates on the surface of the sample at both ends of the straight line in the plane in which the position of the sample is changed using the second scanner, obtains a second straight line for connecting the two three-dimensional coordinates, calculates a length $l_2$ of an orthogonal projection of the second straight line onto a plane in which the position of the sample is changed using the second scanner, and adjusts the position of the second scanner or the first scanner by an angle of $\arctan((l_1-l_2)/2z)$ when a height difference on the surface of the sample at both ends of the straight line in the plane in which the position of the sample is changed using the second scanner is z.

4. A method of measuring a sample using a scanning probe microscope comprising a probe, a first scanner changing a position of the probe along a straight line, and a second scanner changing a position of a sample in a plane, the method comprising:
obtaining a first shape of the sample along a straight line in a plane in which the position of the sample is changed using the second scanner;
rotating the sample by 180 degrees in the plane in which the position of the sample is changed using the second scanner and obtaining a second shape of the sample along the straight line in the plane in which the position of the sample is changed using the second scanner; and
calculating an angle by which the straight line is inclined with respect to a line that is perpendicular to the plane in which the position of the sample is changed using the second scanner based on the first shape and the second shape.

5. The method of claim 4, further comprising calibrating the first scanner by inputting an electrical signal to the scanning probe microscope, the electrical signal being obtained from the first scanner when a measured step difference of a sample corresponds to a known step difference.

6. A method of measuring a sample using a scanning probe microscope comprising a probe, a first scanner changing a position of the probe along a straight line, and a second scanner changing a position of a sample in a plane, the method comprising:
obtaining a first shape of the sample along a straight line in a plane in which the position of the sample is changed using the second scanner;
rotating the sample by 180 degrees in the plane in which the position of the sample is changed using the second scanner, obtaining a second shape of the sample along the straight line in the plane in which the position of the sample is changed using the second scanner, and calculating an angle by which the straight line is inclined with respect to a line that is perpendicular to the plane in which the position of the sample is changed using the second scanner based on the first shape and the second shape; and
adjusting the position of the second scanner or the first scanner in accordance with the calculated angle, so that the straight line along which the position of the probe is changed using the first scanner is perpendicular to the plane in which the position of the sample is changed using the second scanner.

7. The method of claim 6, further comprising calibrating the first scanner by inputting an electrical signal to the scanning probe microscope, the electrical signal being obtained from the first scanner when a measured step difference of a sample corresponds to a known step difference.

8. A method of measuring a sample using a scanning probe microscope comprising a probe, a first scanner changing a position of the probe along a straight line, and a second scanner changing a position of a sample in a plane, the method comprising:

measuring three-dimensional coordinates on a surface of a sample at both ends of a straight line in a plane in which the position of the sample is changed using the second scanner, and obtaining a first straight line for connecting the two three-dimensional coordinates;

rotating the sample by 180 degrees in the plane in which the position of the sample is changed using the second scanner, measuring three-dimensional coordinates on the surface of the sample at both ends of the straight line in the plane in which the position of the sample is changed using the second scanner, and obtaining a second straight line for connecting the two three-dimensional coordinates; and calculating an average straight line of the first straight line and the second straight line, and adjusting the position of the second scanner or the first scanner according to a difference between any one of the first straight line and the second straight line and the average straight line.

9. The method of claim 8, further comprising calibrating the first scanner by inputting an electrical signal to the scanning probe microscope, the electrical signal being obtained from the first scanner when a measured step difference of a sample corresponds to a known step difference.

10. A method of measuring a sample using a scanning probe microscope comprising a probe, a first scanner changing a position of the probe along a straight line, and a second scanner changing a position of a sample in a plane, the method comprising:

measuring three-dimensional coordinates on a surface of a sample at both ends of a straight line in a plane in which the position of the sample is changed using the second scanner, obtaining a first straight line for connecting the two three-dimensional coordinates, and calculating a length $l_1$ of an orthogonal projection of the first straight line into a plane in which the position of the sample is changed using the second scanner;

rotating the sample by 180 degrees in the plane in which the position of the sample is changed using the second scanner, measuring three-dimensional coordinates on the surface of the sample at both ends of the straight line in the plane in which the position of the sample is changed using the second scanner, obtaining a second straight line for connecting the two three-dimensional coordinates, and calculating a length $l_2$ of an orthogonal projection of the second straight line into a plane in which the position of the sample is changed using the second scanner; and adjusting the position of the second scanner or the first scanner by an angle of $\arctan((l_1-l_2)/2z)$ when a height difference on the surface of the sample at both ends of the straight line in the plane in which the position of the sample is changed using the second scanner is z so that the straight line along which the position of the probe is changed using the first scanner is perpendicular to the plane in which the position of the sample is changed using the second scanner.

11. The method of claim 10, further comprising calibrating the first scanner by inputting an electrical signal to the scanning probe microscope, the electrical signal being obtained from the first scanner when a measured step difference of a sample corresponds to a known step difference.

* * * * *